3,125,419
METHOD OF DETERMINING THE CONCENTRATION OF PHOSPHORIC ACID IN A SOLUTION
Isidore Geld and Sidney Tudor, New York, N.Y., assignors to the United States of America as represented by the Secretary of the Navy
No Drawing. Filed July 29, 1960, Ser. No. 46,319
13 Claims. (Cl. 23—230)
(Granted under Title 35, U.S. Code (1952), sec. 266)

The invention described herein may be manufactured and used by or for the Government of the United States of America for governmental purposes without the payment of any royalties thereon or therefor.

This invention relates generally to methods of maintaining control of chemical compositions and more particularly, to a test procedure for use in the compositional control of prepaint rust inhibiting solutions.

In the painting of steel and other metallic structures which are subject to rust, a common procedure is to submit the structure to a "pickling" step and then to immerse the structure in a hot, rust-inhibiting solution. Pickling is employed to remove mill scale and rust from steel plates, shapes or structures and consists of immersion in a hot, dilute acid solution such as sulphuric acid. The excess acid is usually removed by a hot water rinse. The pickled structure is then immersed in a hot rust-inhibiting solution which may usually consist of several pounds, say, about 6 to 7 pounds of sodium dichromate and about 5 to 6 pounds of phosphoric acid (75%) per 100 gals of solution. For effective operation, it is generally preferred that the strength of the rust-inhibiting solution be maintained at 50% to 100% of the aforementioned strength.

The maintenance of rust-inhibiting solutions at proper strength necessitates vigilant control and frequent analyses. It has been found that the rust-inhibiting solutions may change considerably in both sodium dichromate and phosphoric acid content during a single busy workday. Accordingly, on the spot, daily compositional control of the solution should be maintained. Such control may be exercised by the use of well known titrimetric methods both for the determination of the concentrations of the phosphoric acid and the sodium dichromate. Such titrimetric methods are accurate but usually require specialized equipment such a pH meter and also require a high degree of skill in the operating personnel.

It is accordingly an object of the present invention to provide a simple method for on-the-spot control of rust-inhibiting solutions which is satisfactorily accurate, requires little or no special equipment, and which may be carried out by relatively unskilled operating personnel.

It is a further object to provide a method as set forth in the preceding object which employs color comparison to determine the concentration of phosphoric acid in the rust-inhibiting solutions.

It is another object to provide a color-comparison method for on-the-spot control of rust-inhibiting solutions in which it may readily be determined whether or not the inhibiting solutions have been depleted to the half-strength point without requiring a reference to a standard color solution.

It is still another object to provide an improved and simple method for determining the concentration of phosphoric acid in a test solution, which is accurate and dependable even in the presence of sodium dichromate. In accordance with the present invention, there is provided a method of determining the concentration of phosphoric acid in a solution comprising aliquoting a portion of said solution into a vessel, diluting the solution with water a known amount, adding a small known amount of methyl purple indicator to said diluted portion to indicate the degree of acidity thereof whereby a relationship exists between said degree of acidity and the concentration of said phosphoric acid, the color of said solution being purple below a pH of 4.8, green above a pH of 5.4 and light gray to colorless at a pH of 5.1. Then visually compare the color of said solution plus indicator with color standards corresponding to different known concentrations of water diluted phosphoric acid containing methyl purple color indicator.

Other objects and many of the attendant advantages of this invention will be readily appreciated as the same becomes better understood by reference to the following detailed description.

To carry out the method of the present invention, standard solutions of phosphoric acid are first prepared.

PREPARATION OF PHOSPHORIC ACID STANDARDS

A group of square Pyrex bottles, say, about 6 are thoroughly cleaned with a suitable cleaning material such as sulfuric acid-dichromate cleaning solution. The cleaned bottles are then rinsed well with distilled water and soaked in distilled water for about 72 hours. The bottles may be conveniently numbered 0, 1, 2, 3, 4 and 5. The phosphoric acid solutions are prepared as follows:

(1) A quantity of 10.0 ml. of phosphoric acid (85%) is diluted to 1 liter.

(2) To 62.1 ml. of solution (1), there is added 1.35 grams of sodium dichromate $Na_2Cr_2O_7 \cdot 2H_2O$ and the solution is diluted to 1 liter with distilled water.

(3) To 5 ml. of solution (2) there are added 745 ml. of distilled water and the solution is well mixed.

(4) Standard solutions equivalent to 0, 1, 2, 3, 4, and 5 pounds of phosphoric acid (75 percent) per 100 gallons of inhibiting solution are prepared by using 50 ml. of solution (3) for each pound of phosphoric acid (75 percent) per 100 gallons of inhibiting solution and diluting each such standard solution to 500 ml. with distilled water.

(5) The bottles, cleaned and numbered, as set forth above, are filled with the corresponding solutions of phosphoric acid concentrations and 3 drops of methyl-purple indicator are added to each bottle, the bottles are tightly capped and the contents therein are mixed by inverting several times. The bottles marked 0, 1, and 2 will be green with the intensity decreasing as the concentration of phosphoric acid increases, and those marked 3, 4, and 5 will be purple with the intensity increasing as the concentration of phosphoric acid increases. The standards are preferably stored in a cool dark place.

(6) The distilled water used in the preparation of these standards as well as that used in the dilution of the samples preferably should not be exposed to the atmosphere longer than absolutely necessary to avoid absorption of carbon dioxide. In this connection, polyethylene bottles are preferably used in the place of glass bottles in the event that it is desired to store distilled water.

Methyl-purple indicator is a material manufactured by the Fleisher Chemical Company of Washington, D.C., and is disclosed in United States Patent No. 2,416,619. It is a mixed indicator consisting of methyl-red (sodium salt) plus a blue dye. A dilute solution of methyl-red is red below a pH of 4.2 and yellow above a pH of 6.3. The color of the blue dye is not affected by changes in pH. The resultant combined-indicator color is purple below a pH of 4.8, green above a pH of 5.4, and light gray to colorless at a pH of 5.1. Intensity of the purple or green color varies with pH within definite limits.

In carrying out the method of the present invention, about 1 to 2 ounces of filtered rust-inhibiting solution being monitored is cooled to room temperature. A quantity of 0.5 ml. of the filtered solution is diluted to 200 ml. and well mixed. An amount of 21.4 ml. of the diluted solution is poured into as quare Pyrex glass bottle similar to those used in preparing the phosphoric acid color standards and water is added until the volume reaches 160 ml. To this 160 ml. solution is added exactly 3 drops of the aforedescribed methyl purple indicator. The purpose of this large dilution with water is to make the sodium dichromate, which is an oxidizing agent and has a distinctive color, so diluted that its oxidizing effect on the color of the added color indicator, methyl purple, of the comparison solutions will be insignificant and its color effect will be minimized to such an extent that it does not materially interfere with a visual comparison of the diluted test specimen containing a color indicator with comparison colors of water solutions of known concentrations of phosphoric acid. The color of the solution is visually compared with the standard, preferably using a white background to determine the number of pounds of phosphoric acid (75 percent) per gallons of inhibiting solution. If the color of the solution containing the sample does not exactly match any of the standard solutions, fractional estimates may be made.

The concentrations of phosphoric acid in the final solutions containing the sample of the rust-inhibiting solution is such that at one-half the nominal strength of the rust-inhibiting solution, said one-half being say about 2.8 pounds of phosphoric acid (75%) per 100 gallons of solution, the test solution containing the methyl purple is colorless, purple above this half-strength concentration point and green below this concentration point. Above 4.5 pounds per 100 gallons, the pH is outside the range of sensitivity of the indicator, and further dilution of the sample is necessary.

In the following table, there is set forth results obtained using the color comparison method of the present invention as compared with exact chemistry laboratory quantitative titrimetric determination.

*Table of Results*

POUNDS PER 100 GALLONS OF INHIBITING SOLUTION
[Phosphoric acid (75%)]

| Color Comparison | Quantitative Lab. Analysis | Diff. |
|---|---|---|
| 4.25 | 4.28 | −.03 |
| 4.00 | 3.61 | +.39 |
| 4.25 | 4.23 | +.02 |
| 5.25 | 5.13 | +.12 |
| 4.0 | 3.61 | +.39 |
| 4.25 | 4.28 | −.03 |
| 5.25 | 5.12 | +.13 |
| 4.0 | 3.72 | +.28 |
| 5.25 | 5.54 | −.29 |
| 3.5 | 3.19 | +.31 |

An examination of the results shown in the table demonstrates that the deviation of the color comparison method from more exact laboratory quantitative determination is in each case less than one-half pound of ingredient per 100 gallons. The color comparison test is made by relatively unskilled personnel, requires approximately 15 minutes, and is substantially accurate for routine control purposes.

It is also seen that if the half-strength depletion point of the rust-inhibiting solution is the point at which it should be replenished, making the concentration of the constituents in the tested sample such that at the half-strength depletion point, there is no color in the phosphoric acid tests. Therefore, a method is provided wherein the operating personnel can immediately determine whether the concentration of the phosphoric acid in the rust-inhibiting solution is above or below the half-strength depletion point without necessitating any color comparison standards.

The specimens taken for test from the solutions in use are preferably filtered so that any solids in suspension will not alter the colors of the solutions. It will also be understood that within the broadest concept of the invention, color charts corresponding to the colors of the comparison solutions may be employed in place of the different comparison solutions.

This application is directed to subject matter disclosed but not claimed in our recently issued Patent No. 2,937,930.

Obviously many modifications and variations of the present invention are possible in the light of the above teachings. It is therefore to be understood that within the scope of the appended claims the invention may be practiced otherwise than as specifically described.

We claim:
1. A method of determining the concentration of phosphoric acid in a specimen solution that also contains a substantial and unknown amount of an oxidizing agent by comparison with color standards corresponding to different concentrations of water diluted phosphoric acid containing methyl purple color indicator, which comprises diluting with water a measured specimen example of such solution to a selected known dilution where any oxidizing agent in the solution is insignificant in its effect, incorporating in said diluted solution a measured known amount of methyl-purple color indicator, and visually comparing the color of the diluted specimen solution and added color indicator with color of solutions of known concentration of phosphoric acid with the same amount in each of said color indicator to enable one to compute the concentration of phosphoric acid in said specimen solution.

2. The method according to claim 1, wherein the pH range of said plurality of diluted comparison solutions extends in both directions from about 5.1.

3. A method of determining the concentration of phosphoric acid in a test solution that contains sodium dichromate in combination with the utilization of comparison standards, comprising preparing a plurality of comparison solutions of different but progressively varying and known concentrations of phosphoric acid in water with each of said comparison solutions having incorporated therein a prescribed but equal quantity of a color indicator, methyl purple, diluting a specimen of said test solution with water until it has a dilution equivalent to that in said comparison solutions, visually comparing of said colored diluted specimen with the colors of said comparison solutions to indicate the relationship of the concentration of said phosphoric acid in said specimen to the concentration of said phosphoric acid in said comparison solutions.

4. The method according to claim 3, wherein one of the comparison solutions having an acid concentration intermediate the ends of the range of concentrations of said comparison solutions, has a pH that makes said one comparison solution with color indicator approximately colorless.

5. A method of determining whether a rust-inhibiting solution containing phosphoric acid and sodium dichromate at different periods in its use has a desired concentration of the phosphoric acid, which comprises preparing a plurality of separate comparison solutions of phosphoric acid diluted with water to known and selected extents so that such solutions have progressively varying but known concentrations of said acid in a pH range extending in both directions from about 5.1, including in each of such comparison solutions a few and the same number of drops of methyl-purple color indicator, and at intervals in the use of said inhibiting solution removing therefrom a specimen, diluting it with water until a small sample thereof has a dilution equivalent to that in said comparison solutions and to an extent in which the effect of said sodium dichromate on the color indicator to be added is insignificant, said diluting water being substantially deionized water that is substantially free of carbon dioxide, adding methyl-purple color indicator to such small sample in an amount equivalent to that used in the preparation of said comparison solutions, the amount of said color indicator in all solutions being about two drops per one hundred mls. of solution, and placing said small diluted sample with color indicator and comparison solutions in positions for visual comparison of their colors, whereby upon visual comparison of said small sample and the comparison solutions, one may decide the approximate acid concentration in said removed specimen from the inhibiting solution in use.

6. A method for quickly and easily determining the concentration of phosphoric acid in a solution which contains an oxidizing agent or an agent with a significant color, or both, which comprises:
diluting a measured sample specimen of such solution until the effects of any such color and the oxidizing effect of any such oxidizing agent are insignificant, including in such diluted solution a small and measured amount of methyl-purple color indicator, and
visually comparing the final color of such diluted specimen solution with added color indicator with the colors of water diluted comparison solutions having known concentrations of phosphoric acid to each of which has been added the same measured amount of the methyl-purple color indicator,
whereby one can estimate, through observation of the colors of water solutions of known concentrations of phosphoric acid that are nearest to the color of said comparison diluted specimen solution with its said added color indicator, the concentration of the phosphoric acid in such specimen.

7. The method according to claim 6, wherein the colors of some of the comparison solutions are of such dilute phosphoric acid solutions that have pH's in the range both above and below 5.1.

8. A method for quickly and easily determining the concentration of phosphoric acid in a solution which contains an oxidizing agent or an agent with a significant color, or both, which comprises:
diluting a measured sample specimen of such solution until the effects of any such color and the oxidizing effect of any such oxidizing agent are insignificant, and including in such diluted solution a small measured amount of methyl-purple color indicator,
and determining, by a visual comparison of the color of such diluted specimen having said added color indicator with the colors of water solutions of phosphoric acid of different known concentrations of such acid therein and to each of which the same measured amount of the methyl-purple color indicator has been added, the concentration of phosphoric acid in the said sample specimen solution.

9. The method according to claim 6, wherein the oxidizing agent is sodium dichromate.

10. A method for quickly and easily determining in a used rust inhibiting solution originally containing specified concentrations of phosphoric acid and sodium dichromate, the concentration therein, at any time of the phosphoric acid which comprises:
preparing a plurality of comparison dilute water solutions containing phosphoric acid in different and known amounts of such phosphoric acid both above and below about 50% of the specified concentration and a measured uniform and small amount of methyl-purple color indicator, also
preparing a diluted water solution of a measured amount of the rust inhibiting solution where the dilution is sufficient to render insignificant any color effect in such solution of the sodium dichromate,
adding thereto the same amount of said color indicator as for each comparison solution, and
placing the comparison solutions and such prepared diluted solution of the rust inhibiting solution in relative positions enabling visual comparison of their colors,
whereby one can estimate through a comparison of the color of the diluted rust inhibiting solution with the nearest colors of such comparison solutions, the degree of concentration of the phosphoric acid in the rust inhibiting solution.

11. A method for quickly and easily determining in a rust inhibiting solution containing phosphoric acid and sodium dichromate, the concentration therein, at any time, of the phosphoric acid which comprises:
diluting a measured specimen of said solution at known extents until the color thereof is insignificant, including in such diluted solution a small and measured amount of methyl-purple color indicator, and
visually comparing the color of such diluted solution having such color indicator with the colors corresponding to those of a plurality of water diluted solutions of concentrated phosphoric acid of known and varying extents of dilution and containing in each the same measured amount of said color indicator, whereby one can estimate through observation of the colors of said water solutions of known concentrations of the phosphoric acid that are nearest to the color of such comparison diluted rust inhibiting solution, the concentration of the phosphoric acid in the measured specimen in the rust inhibiting solution.

12. A method for quickly and easily determining in a rust inhibiting solution containing phosphoric acid and sodium dichromate, the concentration therein, at any time, during use of such solution, of the phosphoric acid which comprises:
diluting with water a measured specimen of such inhibiting solution by an amount of water which, if the concentration of the acid therein equaled 2.8 lbs. of 75% phosphoric acid per 100 gallons of solution, would have a pH of approximately 5.1,
then adding to such diluted solution a measured small amount of methyl-purple color indicator,
positioning such sample for comparison with the colors of different standard water solutions, diluted to the same extent as said diluted measured specimen, and containing therein known amounts of phosphoric acid, varying in amounts of such acid in different standard solutions, plus in each standard solution an amount of sodium dichromate that would be approximately equal to that in the diluted measured specimen, and the same amount of methyl-purple color indicator as in said diluted measured specimen,
whereby one can estimate through visual comparison of the color of the diluted measured specimen with said comparison color, the degree of concentration of phosphoric acid in said undiluted measured specimen of the rust inhibiting solution.

13. A method for quickly and easily determining in a rust inhibiting solution containing phosphoric acid and sodium dichromate, the concentration therein, at any time, during use of such solution, of the phosphoric acid which comprises:
diluting a quantitatively measured specimen of such inhibiting solution with water to that extent which would be necessary to dilute with water a selected known concentration of phosphoric acid to give it a pH of about 5.1,
adding thereto a small but known amount of methyl-purple color indicator, and
positioning such resultant specimen for comparison with the colors of a plurality of standard water solutions of phosphoric acid in which the phosphoric acid is in known but varying concentrations in different standard solutions, and to each of which diluted standard solutions has been added the same amount of methyl-purple color indicator as was added to the diluted measured specimen, whereby one can estimate through the visual comparison of the color of the diluted measured specimen with the colors of the said diluted standard solutions, the approximate concentration of phosphoric acid in the undiluted measured specimen of the rust inhibiting solution.

References Cited in the file of this patent

UNITED STATES PATENTS

| | | |
|---|---|---|
| 2,416,619 | Fleisher | Feb. 25, 1947 |
| 2,697,651 | Gutzeit | Dec. 21, 1954 |
| 2,765,218 | Amir | Oct. 2, 1956 |
| 2,937,930 | Geld | May 24, 1960 |